United States Patent
Loui et al.

(10) Patent No.: US 11,880,918 B2
(45) Date of Patent: Jan. 23, 2024

(54) METHOD FOR DYNAMIC CREATION OF COLLAGES FROM MOBILE VIDEO

(71) Applicant: Kodak Alaris Inc., Rochester, NY (US)

(72) Inventors: Alexander C. Loui, Rochester, NY (US); Laura R. Whitby, Rochester, NY (US); Joseph A. Manico, Rochester, NY (US)

(73) Assignee: KODAK ALARIS, INC., Rochester, NY (US)

( * ) Notice: Subject to any disclaimer, the term of this patent is extended or adjusted under 35 U.S.C. 154(b) by 454 days.

(21) Appl. No.: 17/598,079

(22) PCT Filed: Jul. 27, 2017

(86) PCT No.: PCT/US2017/044121
§ 371 (c)(1),
(2) Date: Sep. 24, 2021

(87) PCT Pub. No.: WO2018/022853
PCT Pub. Date: Feb. 1, 2018

(65) Prior Publication Data
US 2022/0222876 A1   Jul. 14, 2022

Related U.S. Application Data

(60) Provisional application No. 62/367,962, filed on Jul. 28, 2016.

(51) Int. Cl.
*G09G 5/00* (2006.01)
*G06T 11/60* (2006.01)
(Continued)

(52) U.S. Cl.
CPC .......... *G06T 11/60* (2013.01); *G06F 3/04845* (2013.01); *G06V 10/40* (2022.01); *G06V 20/41* (2022.01)

(58) Field of Classification Search
CPC ......... G06T 11/60; G06T 19/00; G06T 11/00; G06F 9/4443; G06F 3/0481
(Continued)

(56) References Cited

U.S. PATENT DOCUMENTS 7,039,239 B2   5/2006 Loui et al.
9,373,054 B2   6/2016 Loui et al.
(Continued)

OTHER PUBLICATIONS

Geigel et al., "Using genetic algorithms for album page layouts," IEEE Multimedia—Special Issue on Multimedia Content Modeling and Personalization, Oct.-Dec. 2003.
(Continued)

*Primary Examiner* — Gordon G Liu
(74) *Attorney, Agent, or Firm* — HOGAN LOVELLS US LLP

(57) ABSTRACT

A method and system for automated creation of collages from a video sequence is provided. The system and method dynamically extracts key frames from a video sequence, which are used to create the collages shown on a display. By changing the position of cursors, a new set of key frames is extracted and the content of the collage will change correspondingly reflecting the changes in the key frames selection. The method also includes user interface elements to allow a user to change the layout design (e.g., rotate, overlap, white space, image scaling) of the video frames on the collage. In addition, the method includes different ways for browsing the video sequence by using automatically detected semantic concepts in various frames as indexing points. Further, the method includes defining swiping attributes based on motion characteristics (e.g., zoom/pan, motion of object), audio activity, or facial expression for browsing the video sequence.

28 Claims, 8 Drawing Sheets

(51) Int. Cl.
   *G06V 10/40* (2022.01)
   *G06V 20/40* (2022.01)
   *G06F 3/04845* (2022.01)
(58) Field of Classification Search
   USPC .......................................... 345/619
   See application file for complete search history.

(56) References Cited

U.S. PATENT DOCUMENTS

| 10,074,015 | B1* | 9/2018 | Grundmann | G06V 10/771 |
| 2013/0132462 | A1 | 5/2013 | Moorer | |
| 2015/0363409 | A1* | 12/2015 | Wood | G06F 16/583 |
| | | | | 707/738 |

OTHER PUBLICATIONS

Jiang et al., "Short-term audio-visual atoms for generic video concept classification," in Proc. ACM Multimedia 2009.
Wu et al., "Facial expression recognition using Gabor motion energy filters," b\ IEEE Computer Vision and Pattern Recognition Workshops, Jun. 2010.
Chinese Office Action issued in Chinese Patent Application No. 201780045540.3 dated Aug. 22, 2022.
Jinguang Sun et al: "The research based on the video sequence of face key frames extraction", Advanced Computer Theory and Engineering (ICACTE), 2010 3rd International Conference on, IEEE, Piscataway, NJ, USA, Aug. 20, 2010 (Aug. 20, 2010), pp. V4-330, XP031758984, ISBN: 978-1-4244-6539-2.
Decision to Refuse issued by the European Patent Office in European application No. 17 749 301.2 dated Apr. 12, 2023.

* cited by examiner

TABLE 1

| SWIPING ATTRIBUTE | TAP ON SELECTED OBJECT/FRAMES TO |
|---|---|
| MOTION VECTORS TRAJECTORIES (MAGNITUDE OR SPEED OF DOMINANT MOVING OBJECTS IN THE VIDEO) | INCREASE OR DECREASE THRESHOLD ON SPEED (DERIVED FROM MAGNITUDE OF MOTION VECTORS) |
| AUDIO ACTIVITIES | INCREASE OR DECREASE THRESHOLD ON AUDIO VOLUME |
| APPEARANCE OF FACES | INCREASE OR DECREASE THRESHOLD ON NUMBER OF DETECTED FACES |
| EXPRESSION | TOGGLE AMONG ONE OF PREDEFINED EXPRESSION CHOICES (HAPPY, SURPRISE, ANGRY, ETC.) |

FIG.8

METHOD FOR DYNAMIC CREATION OF COLLAGES FROM MOBILE VIDEO

CROSS-REFERENCE TO RELATED APPLICATIONS

This application claims priority to U.S. Provisional Application No. 62/367,962, filed on Jul. 28, 2016, which is also hereby incorporated by reference in its entirety.

BACKGROUND OF THE INVENTION

With the rapid development and lower cost of electronic mobile devices such as smartphones and new digital capture devices, videos generated by the device users are becoming ever popular as is evident by the large volume of YouTube® video uploads, as well as video viewing in the Facebook® social network. These large amounts of videos also pose a challenge for the users to efficiently organize, manage, and retrieve their videos. Further, many users store their image and video files directly on their mobile devices. Hence, there is a need to facilitate easy access and retrieval of user-generated content on the mobile device, allowing users to better utilize image and video content for sharing with friends and family, or for enjoying the special events and moments of their lives.

With easier access to their media content, a user can create personalized photo products and digital output. These include collages, photo books, greeting cards, posters, multimedia slideshows, and highlight videos. These also include other products having an image such as mugs and T-shirts with personalized images imprinted on the various surfaces of the products. It should be noted that still images as well as frames extracted from a video sequence can be used to create these personalized or digital products.

The complex nature of user-generated videos with their unstructured content pose a great challenge to users for retrieving, sorting, and sharing interesting content from a captured video sequence. This is especially challenging when accessing and manipulating video on a mobile device such as a smartphone or a tablet.

A system and method allowing users to interactively select and dynamically adjust a collage output on a mobile device, based on selection of specified key frames from within a video sequence would be very useful. The present invention meets this need and it allows the user to easily locate interesting video frames, create, and adjust the layout of the collages from videos captured on his/her mobile device or digital capture device with simple user actions.

SUMMARY OF THE INVENTION

The present invention is directed to a system and method for interacting with video on a mobile device. Specially, it allows users to construct a summary of their videos for printing or sharing with friends and family By leveraging advanced video processing algorithms, key frames from a video sequence are automatically extracted to serve as indexing points to interesting and relevant segments of the video sequence. The system and method include automatic creation of collages using frames extracted from a video sequence in a dynamic fashion—that is when a different set of frames are extracted or selected from the video sequence, a new collage will be generated correspondingly. This can be part of an automatic process initiated by the device when a new video capture is detected. Also, the user can manually add to or delete from the automatically extracted frames for collage generation.

BRIEF DESCRIPTION OF THE DRAWINGS

FIG. 8 provides a table showing a few swiping attributes provided by the user interface.

DETAILED DESCRIPTION

The present invention is directed to a system and method for automatically creating a collage from mobile video. One way to represent a video sequence is to extract interesting key frames from its content. Selection of key video frames is useful in many applications. For example, it is often desirable to extract and present a subset of video data that can convey an accurate and recognizable summary or synopsis of the video. Key frame extraction algorithms are used to select a subset of the most informative frames from a video, with the goal of representing the most significant content of the video with a limited number of frames. Key frame extraction finds applications in several broad areas of video processing such as video summarization, creating chapter titles in DVDs, video indexing, and making prints from video. Summaries or synopses can also facilitate video sharing or help a user decide whether a full video is worth downloading or viewing. Key frame extraction is an active research area, and many approaches for extracting key frames from videos exist.

Figure 1:
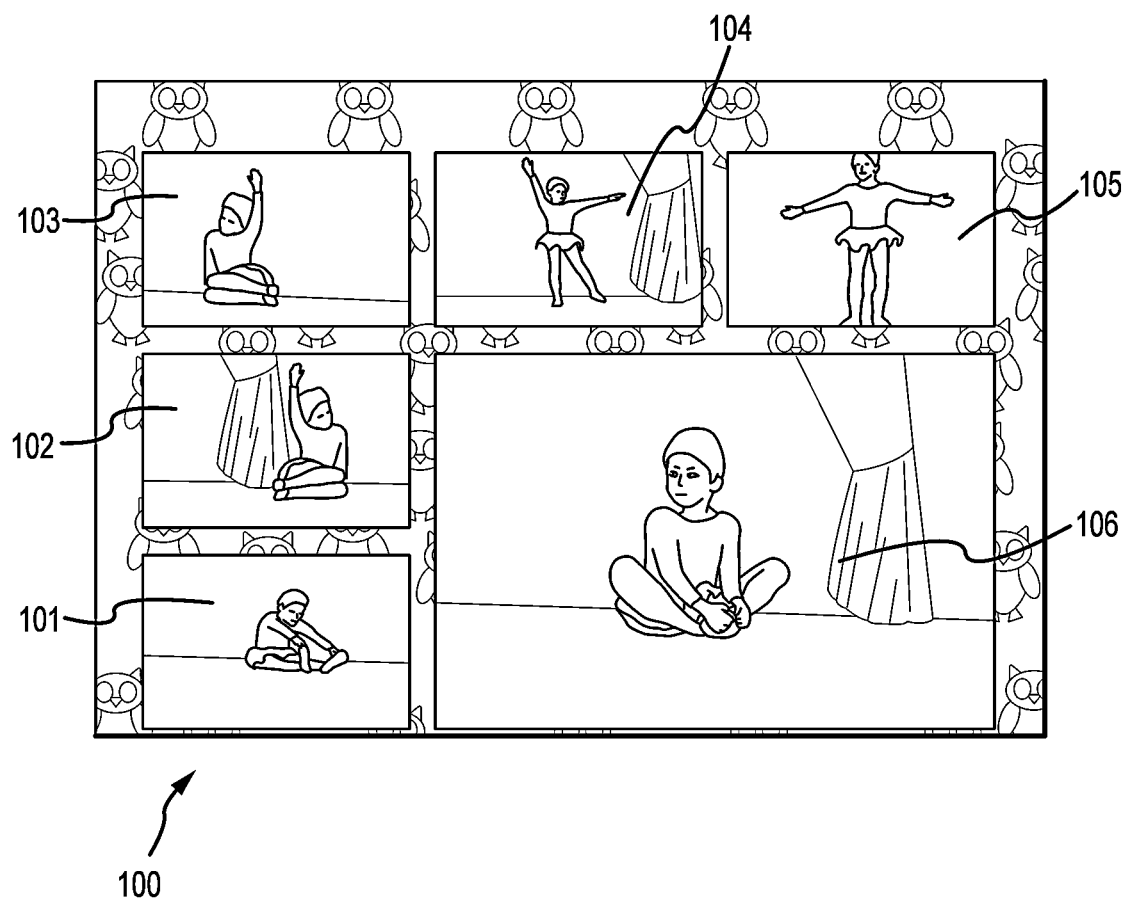
FIG. 1 shows an exemplary collage that was generated from a user/consumer video of a dance recital.

As an example, a collage is generated from a consumer video of a dance recital as shown in FIG. 1. In FIG. 1, different key frames (101-106) representing different movements of the dance sequence are extracted and used to compose a photo collage (100) summarizing the action of the dance video. Currently, there is no easy way for the user to accomplish this task without going through a series of tedious steps to access the video, sort through the entire video sequence, identify the interesting key frames, edit the video to pull out those frames, and to put those frames into a collage or other final form.

Figure 2:
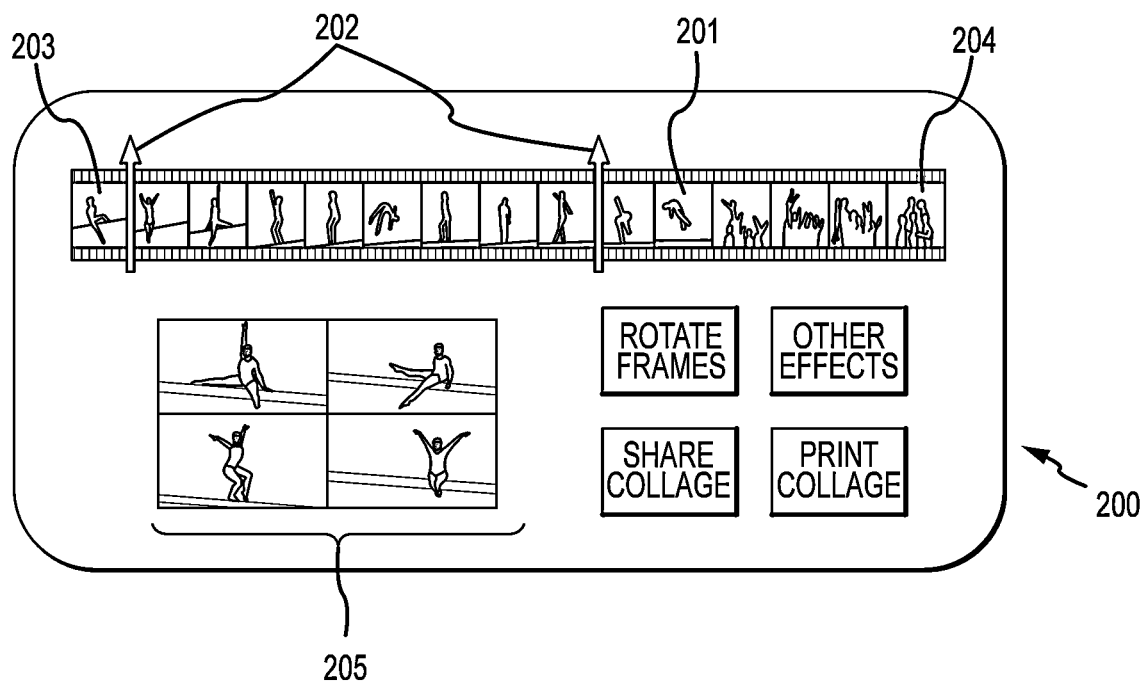
FIG. 2 is a graphical illustration of the method and system for mobile video collage creation.

The present invention may be implemented by a non-transitory computer readable medium, having instructions stored thereon executed by one or more processors. FIG. 2 is a graphical illustration of the method and system for mobile video collage creation. Specifically, the method and system includes: 1) algorithms for processing and analyzing video and images; 2) user interface (GUI) functions for facilitating user selection and interaction; and 3) applications for creating and producing various types of collages. These components can be implemented completely on a mobile device, or on a client-server architecture, where some of the components can be implemented on the client device, for example, and some on the server (e.g., a commercial cloud server).

Figure 3:
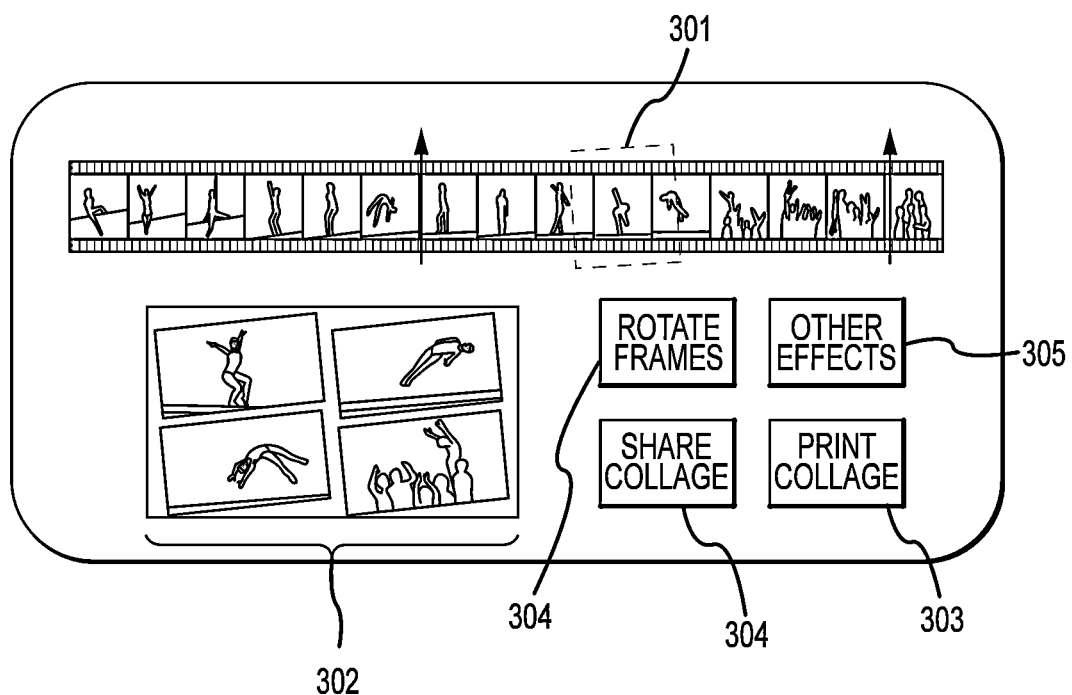
FIG. 3 in an illustration of auto extracted key frames with a tilted collage layout.

With reference to FIG. 2, the input to the system can be a digital video sequence captured directly by a mobile device such as a smartphone or a tablet, or may be a video sequence downloaded to the device. For example, the video sequence may be downloaded from social media sites (e.g., Facebook®, Instagram®, Google+®, Youtube®, Flickr®), from websites, from saved video sequences stored on a local or remote memory, or from video included in email attachments. The operation of the system (referred to herein as the Mobile Collage App) involves the following:

1. A user launches the Mobile Collage App and selects a video sequence from a set of captured or downloaded video sequences. Alternatively, the system automatically detects a new video being captured in the mobile capture device and initiates the Mobile Collage App.
2. A visualization of the video frames 201 is displayed, with a first side, for example the left hand side, of the display corresponding to the start frame 203 and a second side, for example the right hand size, of the display corresponding to the end frame 204 of the video sequence.
3. By using of a pair of selectable cursors 202, the user adjusts the start and end points of a segment of the video sequence by moving the cursors 202 along the length of the video sequence. The Mobile Collage App detects the movement of the cursors, and selects the start and end points of the video in response to the movement. By default, the start and end points are positioned at the beginning and the end of the selected video sequence respectively.
4. When a segment of the video is located according to the positions of the cursors, the Mobile Collage App will automatically extract a plurality of key frames from the video segment. This can be accomplished by using any known extraction method, such as described in U.S. patent application Ser. No. 14/475,074, by Loui and Rhoda, entitled "A method for selecting frames from video based on incremental improvement." This set of key frames represents a summary of the video segment. In another embodiment, this set of key frames can be extracted based on other criteria such as frames containing the face of a particular person, frames containing similar color histogram, frames containing a particular object, etc. Various indexing criteria can be used to extract a plurality of key frames from the selected video segment. In addition, or alternatively, various swiping attributes can be used to extract a plurality of key frames from the selected video segment. Indexing criteria are mainly semantic concepts detected on individual video frames, whereas swiping attributes are more global characteristics related to the entire video sequence, such as motion characteristics or motion of an object across the video frames. Non limiting examples of indexing criteria include facial features, natural scenes, animals, sky elements, cityscapes etc. Non limiting examples of swiping attributes include the speed of a moving object, audio activities, and appearances of faces or expressions of a person.
5. The Mobile Collage App will then generate a collage layout 205 using the extracted key frames and display the collage in the display area 200 of the Mobile Collage App.
6. As the user changes the position of the cursors, a new set of key frames are extracted and the content of the collage will change correspondingly reflecting the changes in the key frames selection. The number of key frames selected depends on the length of the video segment and the start and end points. The key frame extraction algorithm will determine the key frames based on these parameters as well as the motion characteristics of the selected video segment. Note that the number of key frames for a longer extended segment may not necessary increase. It depends on whether additional key frames are detected based on the various features such as motion characteristics, associated audio, quality of the frames, etc.
7. Referring to FIG. 3, the user can use other graphic user interface features to change the layout aspect of the video frames on the collage. For example, through a tilt box 301 super-imposed on the video sequence display area, the user can rotate the box indicating a preference of tilt to be applied to the frames on the collage. The amount of rotation indicates the magnitude of the tilt to be applied to each frame. The orientation of tilt (left or right) will be applied to the frames randomly or manually by the user through the user interface. The resulting layout 302 is shown on FIG. 3. Additional interface features are discussed below.
8. The user selects the collage for printing 303 or sharing 304 with others such as posting on social media networks (e.g., Facebook, Instagram, Google+).

Figure 4A:
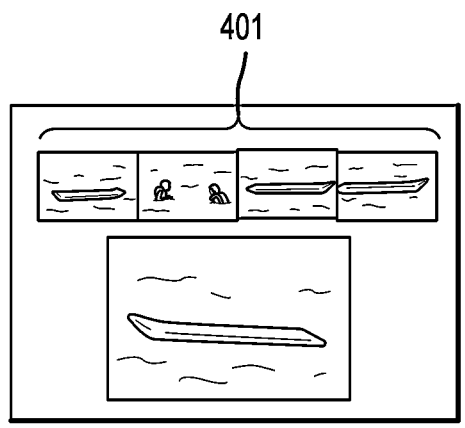
FIG. 4 illustrates non-limiting layout examples using key frames extracted from a video created by a user on a mobile or video capture device.
Figure 4B:
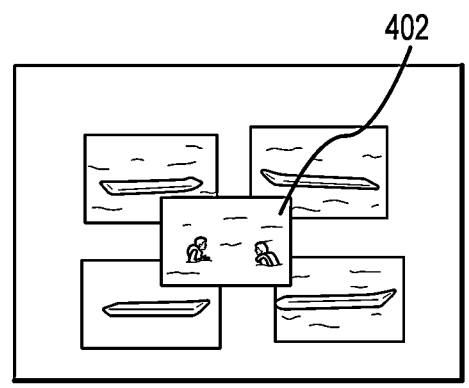
Figure 4C:
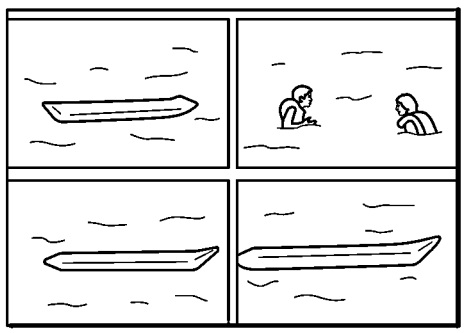
Figure 4D:
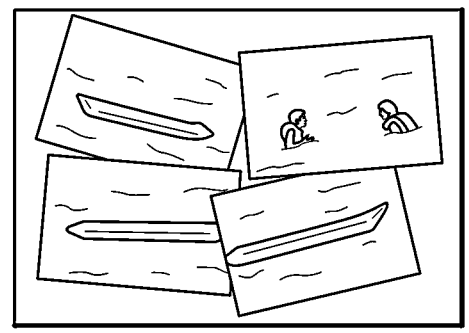

It should be noted that in addition to the rotate or tilt frames option (as shown in FIG. 3), other layout effects and features such as overlap, white space, image scaling can be implemented on the UI. FIG. 4 illustrates non limiting layout examples using key frames extracted from a consumer video. In FIG. 4(a), the extracted key frames are displayed in a chronological sequence 401 on the top of the figure, with one of the key frames being enlarged and highlighted below the sequence. In FIG. 4(b), the key frames are scaled to create more white space on the collage, with an emphasis image 402 placed in the center on top of the other frames. In FIG. 4(c), the key frames are scaled to occupy almost the entire collage area 403 with little white space left. Finally in FIG. 4(d), the key frames are rotated at different angles and overlapped with each other to create a more whimsical kind of collage 404. It should be noted that the above are just a few of the examples and many other layout styles and themes can be implemented using the disclosed system. Specifically, these various layout styles can be implemented using a template-based approach, in which pre-defined layout templates can be selected by the user from a template library stored on the device or through the cloud. Alternatively, an algorithm can be used to generate these different layout styles. One such algorithm is described by Geigel and Loui in "Using genetic algorithms for album page layouts," *IEEE Multimedia—Special Issue on Multimedia Content Modeling and Personalization*, October-December 2003. In reference to this paper, a genetic algorithm is used in the page layout module, which takes in user layout preferences (e.g., degree of rotation, amount of white space, etc.) to automatically generate the various layouts. The user can select these layout effects and preferences through the user interface elements (304 to rotate frames, 305 to access other effects) as illustrated in FIG. 3.

Figure 5:
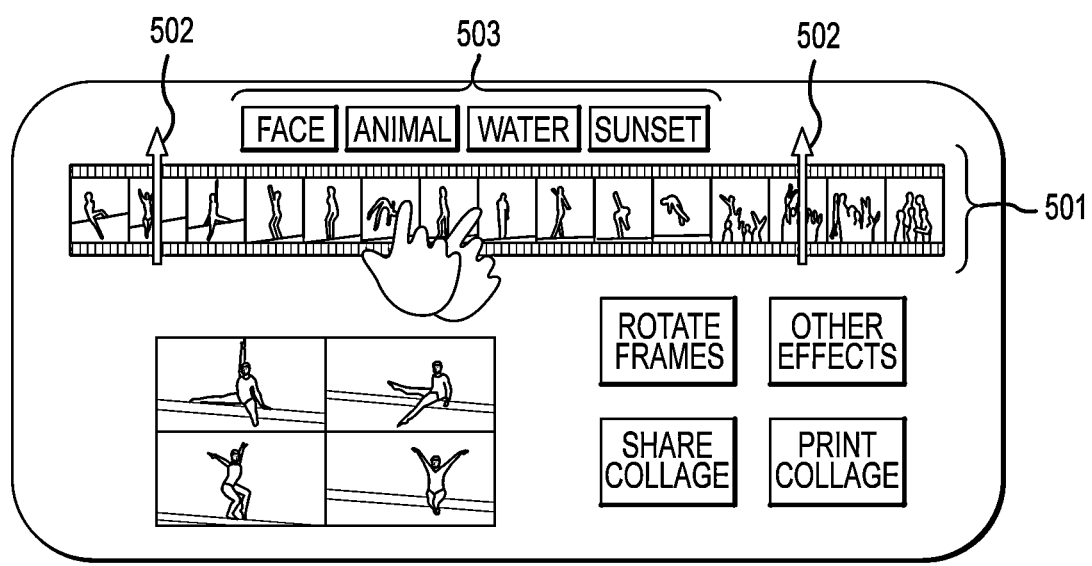
FIG. 5 illustrates an aspect of the invention, which allows the user to easily swipe across a video frame strip representing the video sequence to quickly locate a frame/segment of interest by utilizing the key frames identified with the key frames extraction algorithm described herein as indexing points.

The system and method also facilitate easy access and retrieval of user's video content on a mobile device. Due to the sequential nature of video, locating the right frame or segment within a video sequence is a very tedious task for the consumers. To overcome these challenges and barrier, the system and method include programming responsive to user actions that allow a user to easily view and select certain desired frames from a video. Referring to FIG. 5, one of these features allows the user to easily swipe across a video frame strip 501 representing the video sequence to quickly locate a frame/segment of interest. This is achieved by utilizing the key frames identified with the key frames extraction algorithm described earlier as indexing points 502. When the user swipes across the video frame strip 501, the next automatically detected indexing point 502 will stop at the center (or other selectable point) of the video film strip area 501. If the user continues swiping, the display will continue advancing to the next detected indexing point 502 until the last one. Swiping may be done from either direction, allowing a user to navigate to key frames anywhere in the video segment.

The system and method (as well as the Mobile Collage App) of the present invention may also allow a manual selection of video content topics 503 to guide the key frames or indexing points selection process. (For example, the user can make selections of the desired indexing criteria or swiping attribute, and the Mobile Collage App will "take over" and automatically "swipe" the video and stop to show the user the video section retrieved. The user would then select this selection and then the collage event would take place.) This will help the user to quickly narrow down the type of content that he/she is looking for. Example indexing criteria include "Face," "Animal," "Water," or "Sunset" as shown in FIG. 5. When the user selects a topic such as "Face," the swiping action will locate the next indexing point (key frame) that contains a detected face. In the case that a face or person appears in multiple frames, a best key frame will be to represent the successive frames that contain the same face or person. The best key frame can be determined by using an image quality metric such as sharpness, contrast, tone balance, and noise level. Alternatively, a face quality metric can be used with the quality measure applied only to the detected face regions. Yet another alternative is to combine both types of quality measures, i.e., image-based and face-based metrics.

Furthermore, a set of video content topics 503 can be automatically discovered by the Mobile Collage App through semantic content analysis of the video sequence. Specifically, the output of semantic content analysis algorithms is a set of semantic concept labels that are computed from image pixels of the video frames and associated metadata (e.g., capture date/time, GPS location) if available. These semantic concept labels include both mid-level concept labels (e.g., sky, water, grass), and high-level concept labels (e.g., people, animal, beach, sports).

A method for mid-level semantic analysis may be performed by using a combination of unsupervised and supervised learning for image region classification. The method includes the steps of: a) extracting one or more features from an input image composed of image pixels; b) performing unsupervised learning based on the extracted features to obtain a cluster probability map of the image pixels; c) performing supervised learning based on the extracted features to obtain a class probability map of the image pixels; and d) combining the cluster probability map from unsupervised learning and the class probability map from supervised learning to generate a modified class probability map to determine the semantic class of the image regions. Examples of the semantic class include sky, water, sand/soil, skin, and grass/tree. The extracted features in step a) could include color and textual features. The unsupervised learning step in b) includes the following: 1) determining number of clusters in the input image, 2) estimating parameters of a probabilistic model describing the clusters; and 3) assigning each image pixel to one of the clusters according to the probabilistic model. The details of this method are described in U.S. Pat. No. 7,039,239, May 2, 2006.

A method for high-level semantic concept detection may be performed using a representation called short-term audio-visual atom (S-AVA). An S-AVA is defined as a short-term region track associated with regional visual features and back-ground audio features. Various visual features such as color, texture, edge, and motion, are extracted from the short-term region tracks. The audio features are based on a Matching Pursuit (MP) representation of the audio data. MP basis functions correspond to concentrated bursts of energy localized in time and frequency and span a range of time-frequency tradeoffs, allowing us to describe an audio signal with the basis functions that most efficiently explain its structure. Finally, a joint audio-visual classifier is learned (using for example Multiple Instance Learning) to classify the video sequence. Examples of the semantic class (concept label) are "people," "animal," "beach," and "sunset." The details of this approach are described in the paper "Short-term audio-visual atoms for generic video concept classification," in Proc. ACM Multimedia 2009, by W. Jiang, C. Cotton, S. Chang, D. Ellis, and A. Loui.

The invention utilizes the output of these algorithms for aid in organizing the video frames into different semantic classes. The output of these algorithms are concept labels such as "water," "sunset," "people," etc. By utilizing the output labels of these semantic content analysis algorithms, the system and method provide a customized set of topics for each video sequence. For example, if there is no person or face detected in the entire video, the "Face" topic will not be presented on the user interface.

The system can utilize information derived from motion characteristic of the video sequence. (The previously described "swiping attributes" can include this information.) For example, zoom and panning information can be detected from analyzing the motion vectors of the video sequence, or from the camera's metadata. In some embodiments the global motion analysis is performed using a two-parameter global motion model that provides translational offset information (horizontal and vertical translation) as a function of time. In other embodiments, more complex global motion models can be used to provide additional information such as rotational information on three orthogonal axes and scale (zoom) information. Local motion analysis is performed using local motion models that provide dense local motion information. In some embodiments, the local motion model provides translational motion values for every pixel as a function of time. Local motion models can also provide coarser motion estimates, for example providing a translational motion value for every 8×8 or 16×16 block of pixels. In a preferred embodiment, local motion information provides an indication of the degree of motion occurring in the center region of the video frame. This can be computed, for example, by counting the number of pixels in the center region of a video frame that are identified as being part of moving regions. Global motion information and local motion information determined by the global motion analysis and the local motion analysis, respectively, are inputs to a classifier, which determines video frame classifications for a plurality of the video frames.

The classifier classifies a video frame as a zoom video frame whenever the camera is zooming in or zooming out while that frame is being captured. Zooming processes can be detected through digital image analysis using global motion models that include a scale parameter to detect zoom. Zooming processes can also be detected at capture time by recognizing signals sent to the zoom motor driver to adjust the zoom lens.

The classifier classifies a video frame as a fast pan video frame whenever the magnitude of global translational motion occurring during that video frame exceeds a threshold.

The classifier classifies a video frame as an inactive video frame whenever the magnitude of the global translational motion and the magnitude of the zoom motion, as well as the magnitude of the local motion, are below specified thresholds. Such video frames are indicative of a relatively stationary capture device and a scene with relatively little object motion.

With this feature, the user can double tap on a video segment to automatically locate a key frame after a zoom or fast pan action if such as an action is detected in the video sequence as described above. Doing the same on the next or another segment will locate a different key frame after a zoom or fast pan action and so on.

Figure 6:
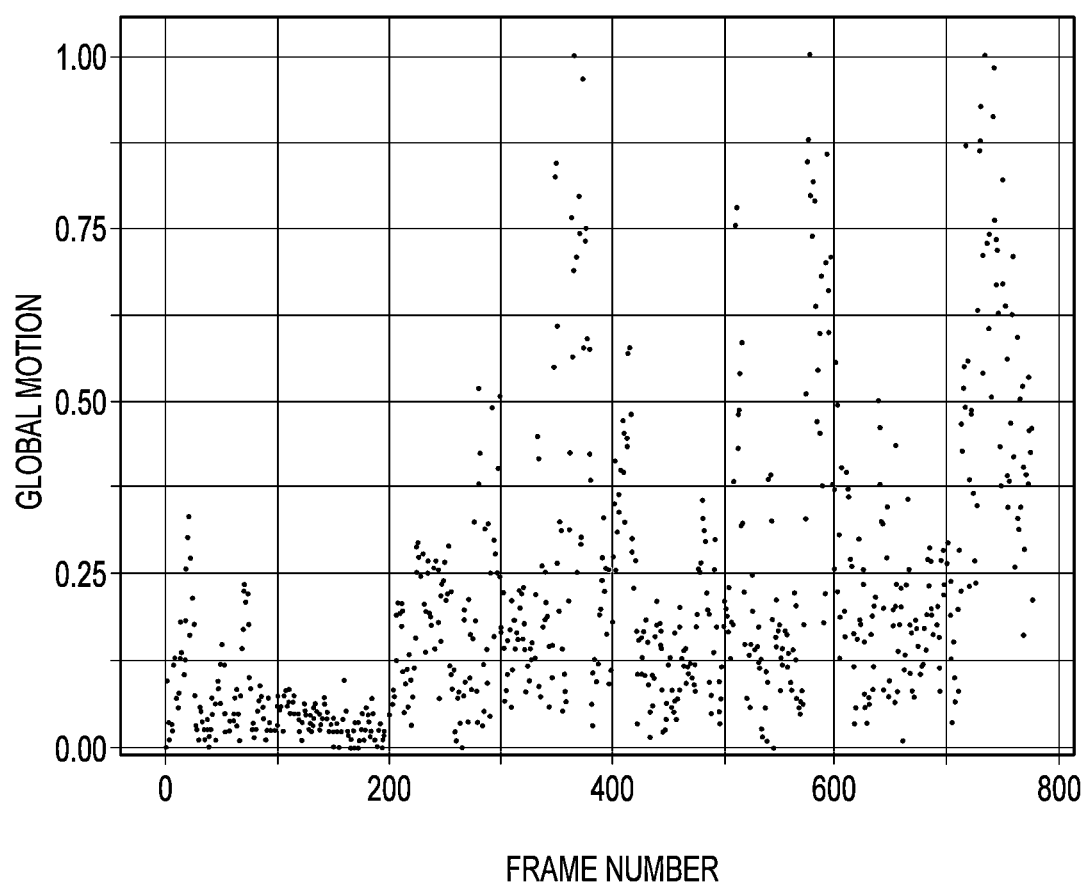
FIG. 6 illustrates motion vectors trajectory from an exemplary video sequence.

The user interface can also provide other swiping attributes as listed on column 1 of Table 1 provided in FIG. 8. These include, but are not limited to, the speed of a moving video object, audio activities, appearance of faces, and expression of a person. These additional attributes can be used in a similar swiping action to search and browse in a more specific manner with different semantic meaning. For example, if a user chooses the "motion vectors trajectories" attribute, and depending on the threshold selected on the speed of the dominant moving objects in the video sequence, the swipe action will automatically determine a suitable representative frame from the video segments that meet the speed threshold. The speed of the dominant moving object is indicated by the motion vectors trajectory as shown in FIG. 6 for an example video sequence. Specifically, the magnitude of the y-axis corresponds to the speed of the object. A default motion threshold can be set by the system based on empirical evaluation of typical video sequences. The threshold can be changed by the user via a system setting through the user interface. Hence, in general, the higher the motion threshold, the fewer the number of frames will be displayed (or used as indexing points) during swiping and vice versa.

Figure 7:
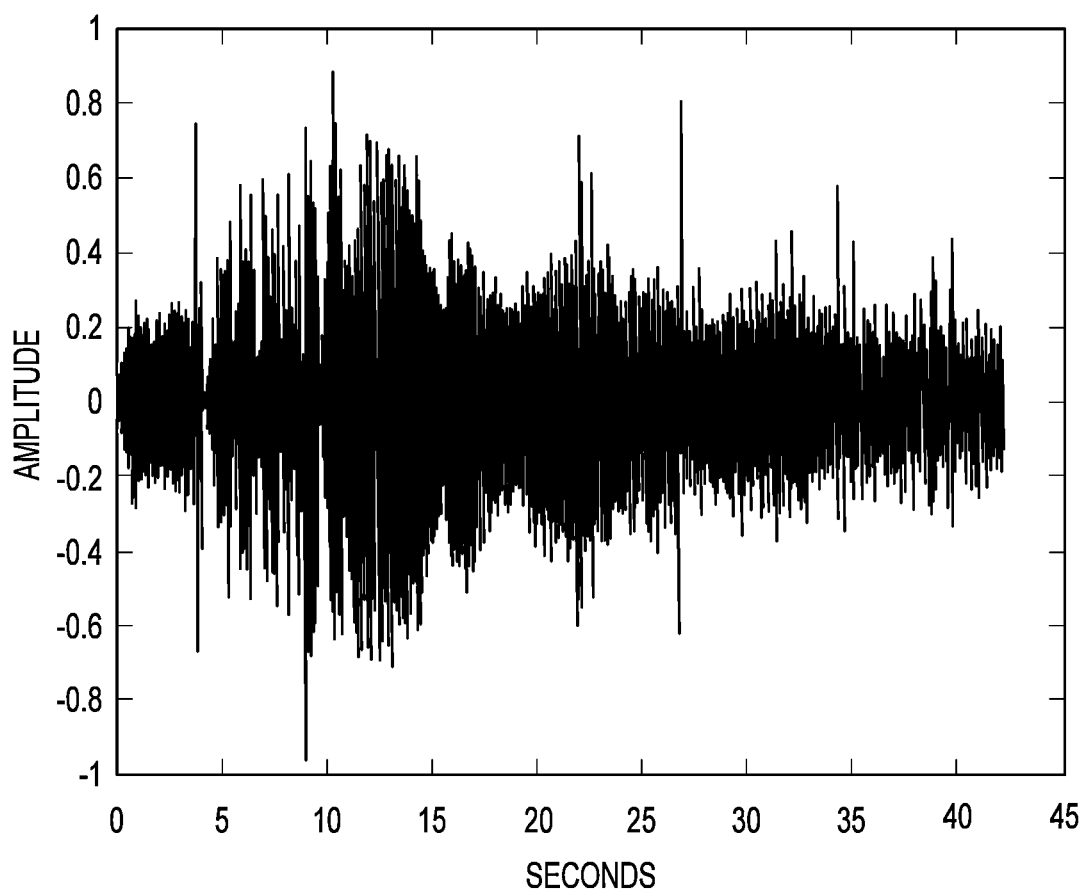
FIG. 7 shows an example plot of the audio signal from an associated video sequence.

As another example, if the user chooses the "audio activities" attribute, and sets a threshold on the volume of the audio, the swipe action will automatically determine a suitable representative frame from the video segments that meet the volume threshold. An example plot of the audio signal from an associated video sequence is shown in FIG. 7. This signal can be extracted from the video sequence by the system. For example, an MPEG video will contain separate video and audio tracks that can be extracted with any MPEG decoding software such as ffmpeg. In this case, the volume of the audio segment is indicated by the magnitude of the y-axis. A default audio threshold can be set by the system based on empirical evaluation of typical audio signal associated with the video sequences. The threshold can be changed by the user via a system setting through the user interface. Hence, in general, the higher the audio threshold, the fewer the number of frames will be displayed (or used as indexing points) during swiping and vice versa.

Table 1 summarizes these additional swiping attributes and the corresponding user interface control feature (column 2). The operation for choosing to have swipe actions corresponding to "appearance of faces" or "expression" also involves comparison of video frames to thresholds. For example, the corresponding thresholds may be the number of detected faces on the video frames, and one of the pre-defined expression choices (such as happy, surprise, angry). The face and expression attributes will depend on the use of face detection algorithm to detect and analyze the face region. The number of detected faces is determined by counting the number of bounding boxes of the detected faces, which are the typical output format of a face detection algorithm. For face expression analysis, a number of facial features can be used such as measurement of mouth openness, mouth prolongation, and eye openness. Additional global feature such as Gabor filters can also be used for expression classification. The details of this approach is described in the paper "Facial expression recognition using Gabor motion energy filters," by T. Wu, M. Bartleet, and J. Movellan, IEEE Computer Vision and Pattern Recognition Workshops, June 2010. The App will analyze the video sequence to detect faces and classify each face according to the expression classes. The user can then select a specific expression (such as "happy" or "exciting" if present) via the user interface. These attributes and the control features (thresholds) provide additional ways for searching and browsing key or interesting video frames much more effectively and efficiently than the existing manual approach.

In addition the swiping attribute may include the capability of face clustering, i.e., grouping of similar faces together. This would allow the user to select a particular face as the search attribute. This would involve additional analysis to extract facial features for clustering, and user interface elements for confirming and correcting the face clusters. The semantic nature of these attributes allows the user to locate relevant video key frames or segments in a more meaningful way.

What is claimed is:

1. A non-transitory computer-readable medium with computer-executable instructions stored thereon executed by one or more processors to perform a method for dynamically creating collages from video sequences within a window displayed on a user device, the method comprising:
    displaying a collection of captured or downloaded video sequences;
    selecting a video sequence from the set of captured or downloaded video sequences, the selected video sequence including a plurality of video frames having a start frame and an end frame;
    displaying a visualization of the plurality of video frames, with a first side of the display corresponding to the start frame, and a second side of the display corresponding to the end frame of the selected video sequence;
    adjusting the start and end frames of the selected video sequence in response to movement of a cursor along a length of the video sequence;
    extracting a plurality of key frames from the selected video segment;
    generating a collage layout aspect using the extracted key frames;
    displaying the collage on the user device; and optionally printing or sharing the collage on a social media network.

2. The computer-readable medium of claim 1, further comprising extracting the plurality of key frames from the selected video segment based on indexing criteria.

3. The computer-readable medium of claim 2, wherein the indexing criteria include at least one of facial features, natural scenes, animals, sky elements, or cityscapes.

4. The computer-readable medium of claim 2, wherein the indexing criteria comprise frames containing a face of a particular person.

5. The computer-readable medium of claim 2, wherein the indexing criteria comprise frames containing a similar color histogram.

6. The computer-readable medium of claim 2, wherein the indexing criteria further comprise frames containing a particular object.

7. The computer-readable medium of claim 2, wherein a best key frame is displayed to the user from the plurality of frames selected through the indexing criteria.

8. The computer-readable medium of claim 1, further comprising extracting the plurality of key frames from the selected video segment based on swiping attributes.

9. The computer-readable medium of claim 8 wherein key frames are located based on motion characteristics of the video sequence.

10. The computer-readable medium of claim 9, wherein the motion characteristics include locating key frames containing zoom or fast pan action.

11. The computer-readable medium of claim 1, wherein the swiping attributes include at least one of a speed of a moving video object, audio activities, appearances of faces, or expression of a person.

12. The computer-readable medium of claim 11, wherein the plurality of key frames is selected based on swiping attributes specifying a speed threshold, volume threshold, or pre-defined expression choice.

13. The computer-readable medium of claim 1, wherein the layout aspect of the video frames on the collage is modified in response to user selected options.

14. The computer-readable medium of claim 1, wherein one or more of rotation, overlap, white space, and image scaling features are modified in the video frames.

15. A method for dynamically creating collages from video sequences within a window displayed on a user device, the method comprising:
  displaying a collection of captured or downloaded video sequences on a display window of a user device;
  selecting a video sequence from the collection of captured or downloaded video sequences, the selected video sequence including a plurality of video frames having a start frame and an end frame;
  displaying a visualization of the plurality of video frames, with a first side of the display corresponding to the start frame, and a second side of the display corresponding to the end frame of the selected video sequence;
  adjusting the start and end frames of the selected video sequence in response to movement of a cursor along a length of the video sequence;
  extracting a plurality of key frames from the selected video segment;
  generating a collage layout aspect using the extracted key frames;
  displaying the collage on the user device; and optionally printing or sharing the collage on a social media network.

16. The method of claim 15, further comprising extracting the plurality of key frames from the selected video segment based on indexing criteria.

17. The method of claim 16, wherein the indexing criteria include at least one of facial features, natural scenes, animals, sky elements, or cityscapes.

18. The method of claim 16 wherein the indexing criteria comprise frames containing a face of a particular person.

19. The method of claim 16, wherein the indexing criteria comprise frames containing similar color histogram.

20. The method of claim 16, wherein the indexing criteria further comprise frames containing a particular object.

21. The method of claim 16, wherein the best key frame is displayed to the user from the plurality of key frames selected through the indexing criteria.

22. The method of claim 15, further comprising extracting a plurality of key frames from the selected video segment based on swiping attributes.

23. The method of claim 22 wherein the swiping attributes include at least one of the speed of a moving video object, audio activities, appearances of faces and expression of a person.

24. The method of claim 23, wherein the plurality of key frames is selected based on swiping attributes specifying a speed threshold, volume threshold, or pre-defined expression choice.

25. The method of claim 23 wherein key frames are located based on motion characteristics of the video sequence.

26. The method of claim 25, wherein the motion characteristics of the video include locating key frames containing zoom or fact pan action.

27. The method of claim 15, wherein the layout aspect of the video frames on the collage is modified in response to selected options.

28. The method of claim 15, wherein one or more of overlap, white space, and image scaling features are modified in the video frames.

* * * * *